Feb. 29, 1944.  E. SWANSON  2,343,033
RAKE
Filed May 25, 1943
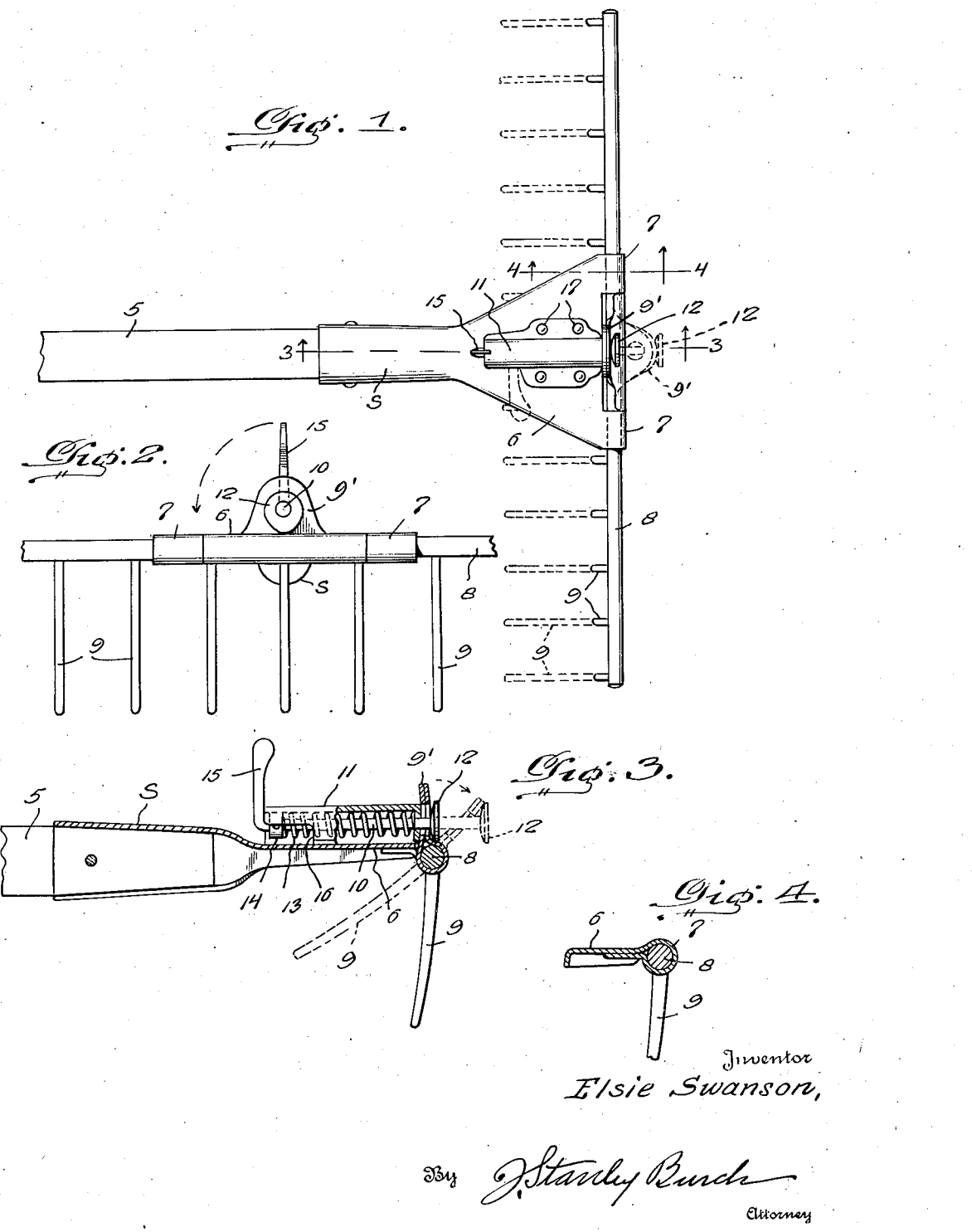
Inventor
Elsie Swanson,
By J. Stanley Burch
Attorney Patented Feb. 29, 1944

2,343,033

UNITED STATES PATENT OFFICE 2,343,033

RAKE

Elsie Swanson, Seattle, Wash.

Application May 25, 1943, Serial No. 488,447

2 Claims. (Cl. 56—400.20)

This invention relates to an improved lawn and garden rake of the type embodying a hinged rake head normally yieldingly held in a forwardly swung operative position substantially at right angles to the rake handle but free to swing rearwardly upon forward movement of the rake so as to automatically clean leaves and trash from the teeth of the rake head when used to rake a lawn or the like.

The primary object of the present invention is to provide an efficient rake of the above type, and one which is extremely simple and durable in construction, economical to manufacture, and otherwise well adapted for successful commercial use.

The present invention also contemplates the provision of novel and efficient means to secure the rake head in its forwardly swung operative position and against rearward swinging movement for use as an ordinary rigid rake when cleaning of the teeth is not necessary, such as when using the rake for gardening purposes.

With the above and other objects in view, the present invention consists in the novel form, combination and arrangement of parts hereinafter more fully described, shown in the accompanying drawing and claimed.

In the drawing:

Figure 1 is a top plan view of a rake constructed in accordance with the present invention, the handle of the rake being broken away.

Figure 2 is a fragmentary front elevation of the rake shown in Figure 1.

Figure 3 is an enlarged vertical section taken on line 3—3 of Figure 1; and

Figure 4 is a fragmentary section taken on line 4—4 of Figure 1.

Referring in detail to the drawing, the present rake includes a handle 5 fixed in the socket member S of a holder having a wide bifurcated forward portion 6 whose legs form transversely alined spaced bearings 7.

The rake further includes a rake head comprising a cylindrical cross-bar 8 provided with spaced depending rake teeth 9 and rotatably fitted in the bearings 7. The rake head is thus hinged for swinging movement about a horizontal axis in the legs of the holder.

Rigid with and rising from the cross-bar 8 between the bearings 7 is an ear 9', through which loosely extends the forward end of a rod 10 slidably and rotatably mounted in a housing 11 fixed upon the wide forward portion 6 of the holder. The outer end of the rod 10 has a head 12 engaging the front face of ear 9', and rod 10 is yieldingly urged rearwardly by a compression spring 13 encircling the same within the housing 11 between the front wall of the latter and a collar 14 secured on the rear end portion of said rod 10. The arrangement is such that the spring 13 normally urges the rod 10 rearwardly so as to swing the rake head to a position wherein the teeth 9 are disposed at right angles to the handle 5, the forward swinging movement of the rake head being limited by engagement of ear 9' with the forward end of housing 11. Thus, it will be seen that, upon rearward movement of the rake, the latter will act to effectively gather leaves and trash. However, upon forward movement of the rake and downward pressure thereon, the rake head will yield or swing rearwardly, as shown by dotted lines in Figures 1 and 3, so that any leaves or trash caught in the teeth 9 will be effectively stripped therefrom.

When the rake is used for gardening or like purposes, there will be no need of permitting the rake head to yield for cleaning the teeth thereof. I accordingly provide means to releasably secure the rake head in its normal forwardly swung or operative position. This means consists in providing the inner end of rod 10 with a lateral handle 15 which may be swung to rotate rod 10 so that it assumes a position abutting the inner end of the housing 11 and out of alinement with the slot 16 of the latter as shown in Figure 3. Also, the head 12 is in the form of a cam which impinges the rake head when the handle is turned to this securing position, thereby holding the handle in this securing position, with the head 12 drawn against ear 9' and ear 9' drawn against housing 11. Thus conditioned, the rake head will be effectively held in its forwardly swung position, and the rake may then be used the same as an ordinary rigid rake. By rotating rod 10 by means of handle 15, the head 12 may be released from the rake head and hand 15 may be brought in alinement with slot 16 so that the latter will permit handle 15 to move forwardly and allow the rake head to yield rearwardly as before mentioned.

The holder is preferably formed of sheet metal with its portion 6 flat and the housing 11 flanged and riveted thereon as at 17. Also, the ear 9' may consist of the ends of a strip of metal bent around and welded or soldered to the cross-bar 8, as clearly shown in Figure 3. The terms "forward" and "rearward," as used herein, respectively refer to directions away from and toward the operator.

From the foregoing description, it will be seen that I have provided a rake of the type described which is extremely simple and durable in construction, efficient in use, and economical to manufacture. The rake comprises a minimum number of simple and durable parts, so that it may not readily get out of order, and so that it is convenient to quickly release the rake head or rigidly fasten it against yielding. Minor changes in the details of construction illustrated and described are contemplated such as fairly fall within the scope of the invention as claimed.

What I claim as new is:

1. A rake of the character described, including a rake head consisting of a cross-bar having depending rake teeth, a handle holder having a wide bifurcated forward portion whos legs form spaced transversely alined bearings in which the cross-bar of the rake head is journaled, an ear rigid with and rising from the cross-bar between said bearings, a housing fixed on the forward holder portion and having a spring-pressed rod slidably and rotatably mounted therein said rod being yieldingly urged rearwardly and having its forward end loosely extending through said ear, a head on the rod in front of said ear and a handle on the rear end of said rod positionable to engage the rear end of the housing to hold the rake head in forwardly swung operative position, said housing having a slot with which the handle may be alined to allow rearward yielding of the rake head.

2. A rake of the character described, including a rake head consisting of a cross-bar having depending rake teeth, a handle holder having a wide bifurcated forward portion whose legs form spaced transversely alined bearings in which the cross-bar of the rake head is journaled, an ear rigid with and rising from the cross-bar between said bearings, a housing fixed on the forward holder portion and having a spring-pressed rod slidably and rotatably mounted therein, said rod being yieldingly urged rearwardly and having its forward end loosely extending through said ear, a head on the rod in front of said ear and a handle on the rear end of said rod positionable to engage the rear end of the housing to hold the rake head in forwardly swung operative position, said housing having a slot with which the handle may be alined to allow rearward yielding of the rake head said head comprising a cam adapted to impinge the rake head to hold the rod against turning when the handle is in engagement with the rear end of the housing.

ELSIE SWANSON.